July 16, 1968 V. A. DI DOMENICO ET AL 3,392,822
DISPLAY CARTON
Filed May 17, 1966 4 Sheets-Sheet 1
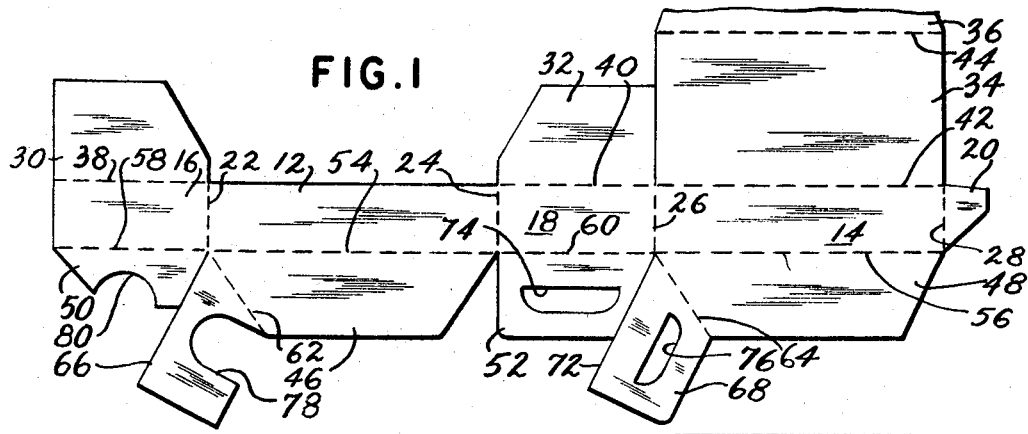
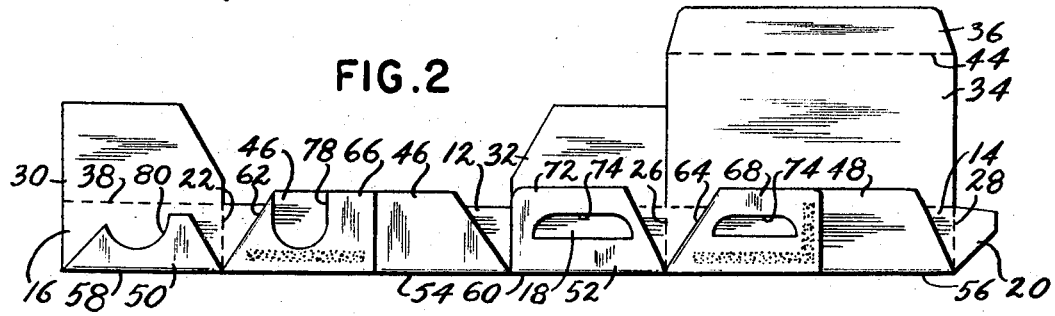
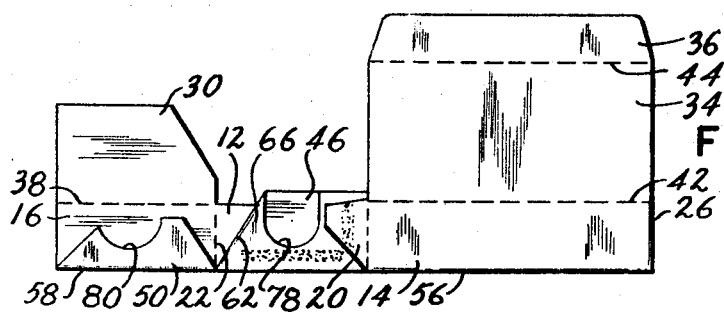
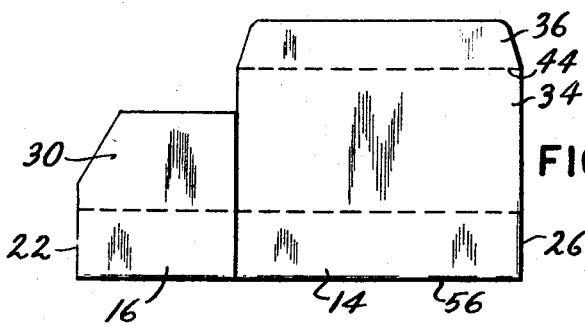
VINCENT A. DI DOMENICO
EUGENE LA MORTE
INVENTORS
BY 
ATTORNEY

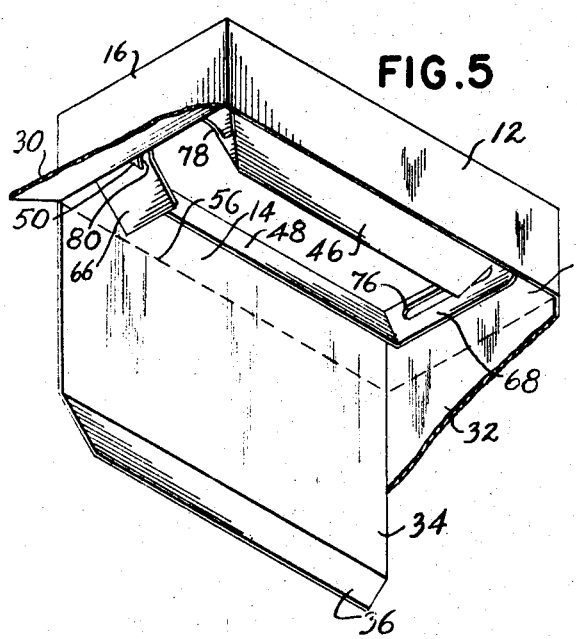
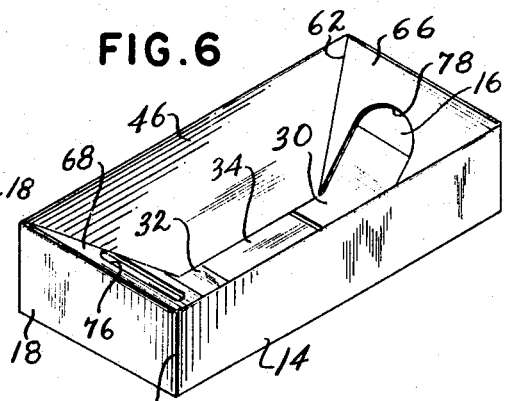
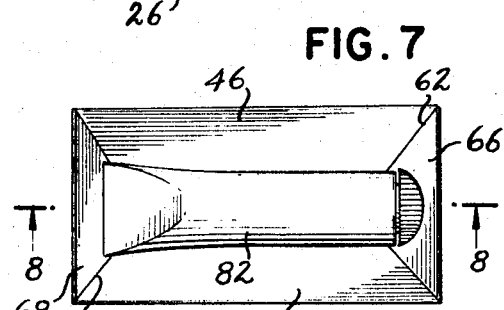
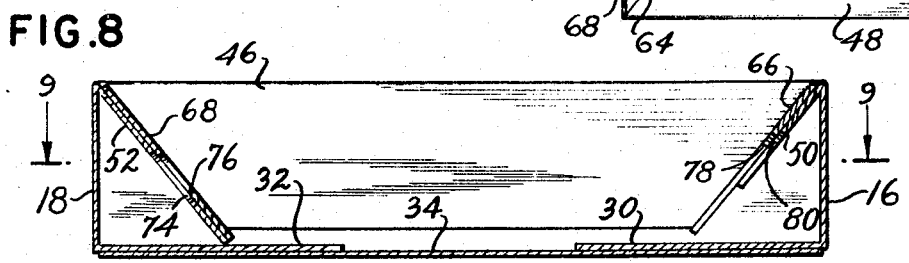
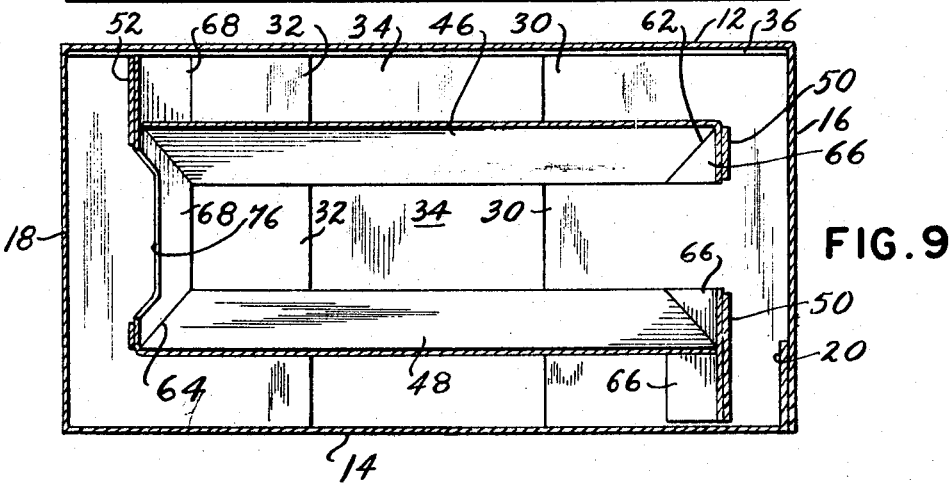

July 16, 1968 V. A. DI DOMENICO ET AL 3,392,822
DISPLAY CARTON
Filed May 17, 1966 4 Sheets-Sheet 3

United States Patent Office 3,392,822
Patented July 16, 1968

3,392,822
DISPLAY CARTON
Vincent A. Di Domenico and Eugene La Morte, New York, N.Y., assignors to E. J. Trum, Inc., Brooklyn, N.Y., a corporation of New York
Filed May 17, 1966, Ser. No. 550,788
17 Claims. (Cl. 206—45.14)

ABSTRACT OF THE DISCLOSURE

A display carton formed of a unitary blank that may be glued and flat folded and automatically set up from flat folded state to provide a carton with a display bed formed of convergent panels connected to the walls of the carton, by pressing the ends of the folded blank toward one another. The blank is formed to provide upright walls and pairs of interconnected panels; one of each pair connected to a wall and the other connected to the one panel and adhesively secured to a wall adjacent to the first wall.

---

The present invention relates to a folding box or carton and, more particularly, to a folding display box or carton of the type having provision for supporting and immobilizing within it an article in fixed position for display.

It is an object of the present invention to provide a display box or carton, of the character described, which is formed of a unitary blank, with the article-holding and supporting means integral with the walls of the box.

It is also an object of the present invention to provide a display box or carton, of the character described, which may be folded and glued on standard and conventional carton folding and gluing apparatus, at substantially the same rate of speed as ordinary boxes or cartons.

It is another object of the present invention to provide a display box or carton, of the character described, which may be set up from folded and glued state likewise by standard and conventional apparatus used for setting up conventional types of boxes or cartons.

It is still another object of the present invention to provide a display box or carton, of the character described, whose article-supporting structure is automatically set up into article-receiving and supporting position when the folded and glued blank is set up into box form.

It is yet another object of the present invention to provide a display box or carton, of the character described, whose article-supporting structure serves as a reinforcement for the walls of the box or carton.

It is a further object of the present invention to provide a display box or carton, of the character described, whose article-supporting structure securely holds and cushions the article disposed and supported therein against shock and displacement and may permit shipment of the loaded cartons without the need for any further provision for protecting its contents, as packing, or the like.

It is a still further object of the present invention to provide a display box or carton, of the character described, whose article-supporting structure provides areas for the printing of display or advertising legend.

The foregoing and other objects and advantages of the folding display box or carton of the present invention will become more readily apparent to those skilled in the art from the embodiments thereof shown in the accompanying drawing, and from the description following. It is to be understood, however, that such embodiments are shown by way of illustration only, to make the principles and practice of the invention more readily comprehensible and without any intent of limiting the invention to the specific details therein shown.

In the drawings:

FIG. 1 is a plan view of one embodiment of a blank for forming the display box or carton of the present invention, as viewed from its inner surface;

FIG. 2 is a plan view shown the blank of FIG. 1 after a first step of folding and gluing;

FIG. 3 is a plan view showing the blank of FIG. 1 after a second step of folding and gluing;

FIG. 4 is a plan view of the completely folded and glued blank of FIG. 1;

FIG. 5 is a view of the glued and folded blank, in partly set-up position as viewed from its underside, before the bottom wall thereof is folded into place;

FIG. 6 is a perspective view of the fully set-up display box of the present invention; shown with its bottom closed;

FIG. 7 is a top plan view of the box of FIG. 6, shown with an article supported and held therein for display;

FIG. 8 is an enlarged, sectional view taken on line 8—8 of FIG. 7, with the article removed;

FIG. 9 is a sectional view taken on line 9—9 of FIG. 8;

Figure 10:
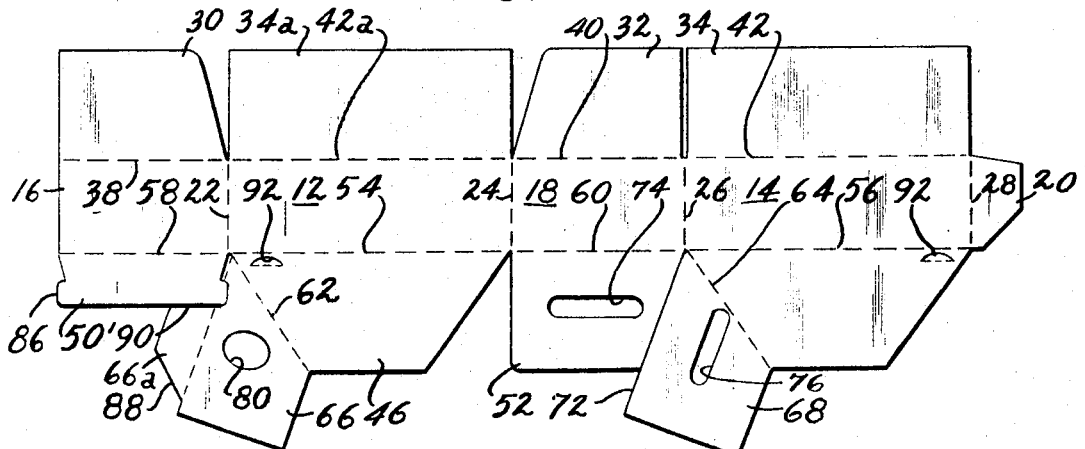
FIG. 10 is a plan view of a blank for a modified embodiment of a display box of the present invention.

Referring now, in greater detail, to the embodiments of the invention illustrated in the drawings, and with particular reference to the embodiment of FIGS. 1–9, inclusive, the blank from which it is formed, generally designated as 10, comprises a unitary section of cardboard cut and scored to form alternating side and end walls 12 and 14 and 16 and 18, respectively, with one of the terminal walls, such as side wall 14, having an upwardly-tapering gluing flap 20, provided on its end. The pair of end walls 16 and 18 and the pair of side walls 12 and 14 may differ in length, so as to form an elongated rectangle when set up. Side wall 12 may be defined from end walls 16 and 18 by foldlines 22 and 24, and side wall 14 may be defined from end wall 18 by foldline 26, and from gluing tab 20 by foldline 28.

The bottom-forming panels may all extend along one side of the blank and may include flaps 30 and 32, which extend from and may be co-extensive in length with end walls 16 and 18, and the bottom wall-forming panel 34, extending from end wall panel 14, co-extensive in length therewith and of a width equal to the length of end walls 16 and 18. Bottom wall panel 34 may be provided on its outer edge with a flap 36. Bottom flaps 38 and 32 are defined from their respective end walls 16 and 18 by foldlines 38 and 40, and bottom wall panel 34 is defined from side wall 14 by foldline 42 and from flap 36 by foldline 44.

Secured to the opposed edges of panels 12, 14, 16 and 18, are cradle-forming panels and flaps consisting of panel 46, extending from side wall panel 12, a panel 48, extending from side wall 14, a panel 50, extending from end wall 16, and a panel 52, extending from end wall 18. Panels 46, 48, 50 and 52 are defined from the respective side and end walls by foldlines 54, 56, 58 and 60. It may here be stated that all of the foldlines heretofore designated face in the same direction.

It may here also be stated that a bottom wall panel may be provided on side wall 12 and that flaps 38 and 40 may be of a size to be co-extensive with the bottom wall 34 or of any intermediate size.

Panels 46 and 48, and also panel 52, if desired, may be of a height greater than the height of side walls 12 and 14 and end wall 18 from which they extend, for a reason which will hereinafter become clear. Panels 46 and 48 have outwardly-tapering side edges which are all disposed at equal angles to the foldlines at their bases; the tapered edges of the panels 46 and 48 facing the panels 50 and 52, respectively, are formed by foldlines 62 and 64, so that when the glue tabs 66 and 68 are integrally-formed glue tabs 66 and 68, respectively. The glue tabs 66 and 68 are each partly formed from the adjacent panels 50 and 52, respectively, and are defined from said panels by sloping cutlines forming portions of the tab edges 70 and 72, respectively, and have parallel side edges and an outer edge perpendicular to such side edges. The edges 70 and 72 of the glue tabs 66 and 68 which face panels 50 and 52 may preferably be disposed at an equal angle to foldlines 58 and 60 as the foldlines 62 and 64, so that when the glue tabs 66 and 68 are folded along foldlines 62 and 64, against panels 46 and 48, respectively, such edges 70 and 72, will register with foldlines 54 and 56. The glue tabs 66 and 68 may be of the same height as the panels 46 and 48, so that when folded as described their other side edges will substantially coincide with the outer edges of panels 46 and 48.

Panel 52 may have an article-engaging opening 74 formed therein, to receive the end of an article, and glue tab 68 may have a correspondingly-shaped opening 76, formed therein, arranged to register with opening 74 when the panel 52 is superposed on folded-over glue tab 68. Glue tab 66 also has article-engaging means formed therein which may be in the form of a recess 78, formed therein facing away from the adjacent panel 50 and the latter may have a recess 80, formed therein, adapted to register with the recess 78 when panel 50 is superposed on folded-over glue tab 68.

The blank 10 may be glued and folded by the following steps. Panels 46, 48, 50 and 52 are folded along foldlines 54, 56, 58 and 60, respectively, over side walls 12 and 14, and end walls 16 and 18, respectively, and glue tabs 66 and 68 folded over on panels 46 and 48, respectively. Glue is then applied to portions of the expose surfaces of glue tabs 66 and 68 and the underside of glue tab 20 (FIG. 2). Side wall 14 is then folded on foldline 26 over panel 52, which overlies end wall 18, and over a portion of panel 46 which overlies side wall 12. The glue flap 20 will overlie an unglued portion of the glue tab 66, with its glued surface exposed. By this step glue tab 68 is adhesively secured to panel 52 with their openings 74 and 76, respectively, registering (FIG. 3). End wall 16 with the overlying panel 50 are then folded on foldline 22 over glue tab 66 which overlies panel 46; panel 50 becoming adhesively secured to glue tab 66, and the exposed end portion of end wall 16 becoming adhesively secured to glue tab 20; the panel 50 having its outer edge portion cut away so as to expose such end portion of end wall 16 for contacting the glue tab 20. The last step completes the gluing and flat-folding of the blank, as indicated in FIG. 4 of the drawings, for convenient and compact storage and transportation.

To set up the flat-folded and glued blank, pressure is applied to the edges thereof along foldlines 22 and 26. Such pressure causes the flat-folded and glued blank to open up into rectangular shape. This movement, in turn, causes panel 46 and glue tab 66, connected thereto, and panel 48 and glue tab 68, connected to it, to tilt away from their associated side and end walls 12 and 16 and 14 and 18, respectively, to assume a position at an angle to such side and end walls (FIG. 7). The free end of panel 48 will ride on glue tab 50, to be supported thereon, and the free end of panel 46 will ride on glue tab 52, to be suppported thereon, panels 46, 48, 50 and 52 forming an inwardly-tapering cradle.

When bottom flaps and wall panel 30, 32 and 34, respectively, are folded in to form the bottom of the box, as may be done on conventional equipment, the outer edges of the cradle panels may rest on such bottom wall and be supported thereon, to thereby rigidify the cradle. Also, the glue flaps 66 and 68 may be of such length that their straight end edges will engage against the adjacent side walls, to further rigidify the box proper. After the box is set up as described above, an article, such as the tube of paste, or the like, 82, illustrated in FIG. 7, may be placed in the cradle with one end thereof engaged in the registering openings 74 and 76 and the other end engaged in the registering recesses 78 and 80.

Figure 11:
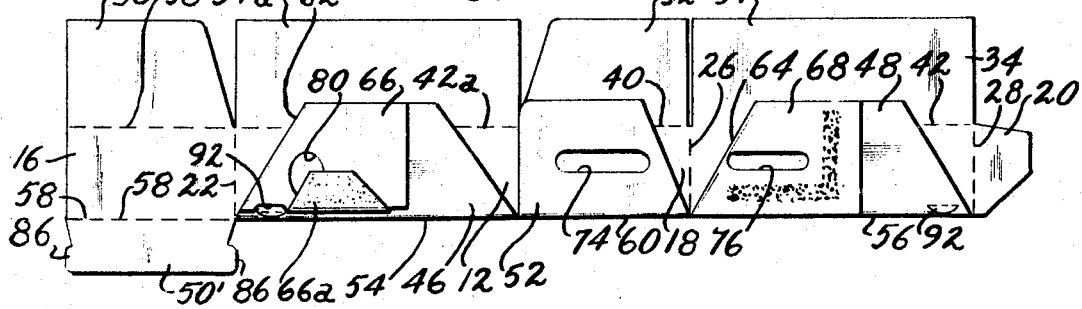
FIG. 11 is a plan view showing the blank of FIG. 1 at one stage of folding and gluing.
Figure 12:
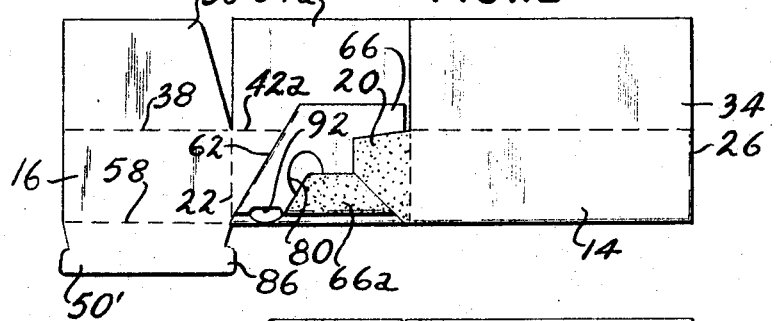
FIG. 12 is a similar view at a second stage of folding and gluing.
Figure 13:
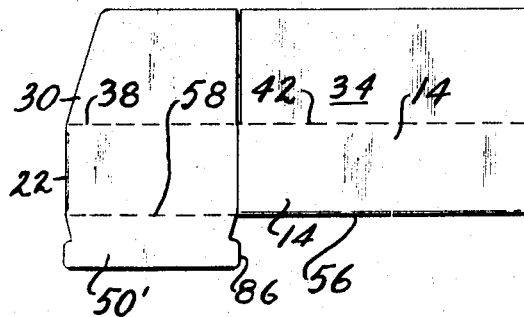
FIG. 13 is a plan view of the completed flat-folded and glued blank of FIG. 10.
Figure 14:
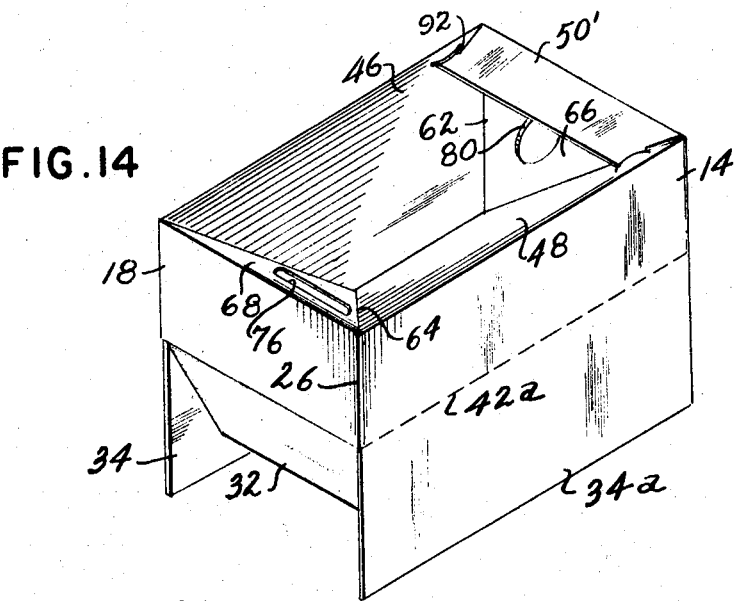
FIG. 14 is an isometric view of the folded and glued blank of FIG. 13, in partly set-up, box-forming position; before closing the bottoms.
Figure 15:
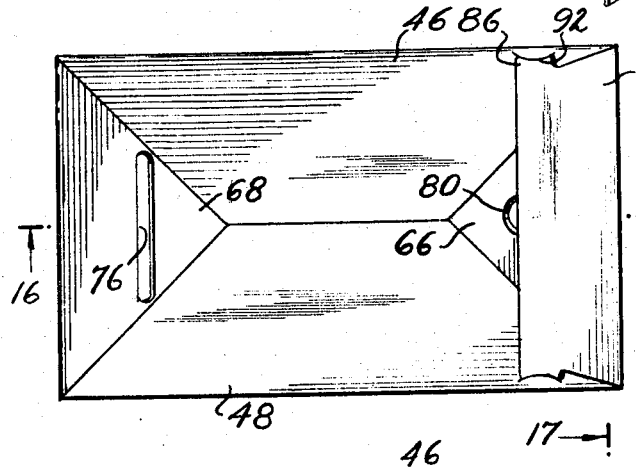
FIG. 15 is a top plan view of the fully set-up box.
Figure 17:
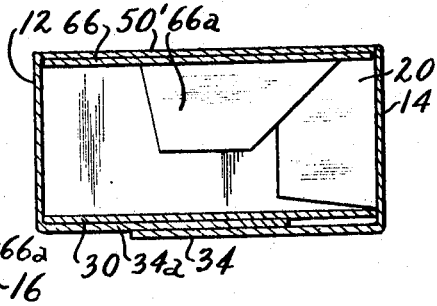
FIG. 17 is a section taken on line 17—17 of FIG. 16.
Figure 16:
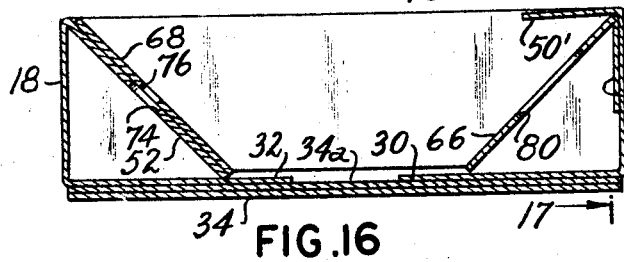
FIG. 16 is a section taken on line 16—16 of FIG. 15.

In the embodiment of the invention illustrated in FIGS. 10 to 17, wherein parts congruous with parts of the first embodiment are identified by the same reference numbers, the box is modified to provide it with a different bottom closure and, especially, to modify the top thereof to provide a shield, at the top edge, over one end of the cradle, which is particularly adapted to bear printed advertising, or like legend, and also serves to firm up the set-up box at the top.

To the foregoing ends, both side walls 14 and 12 may be provided with bottom-forming panels 34 and 34a, respectively, neither of which may be of a height more than a little in excess of the length of an end wall 16 or 18, so that the two panels 34 and 34a may but slightly overlap and be glued together in overlapping position to form the box bottom, above the unfolded end wall panels 30 and 32.

Also, to that end, tab 66 may not, itself, comprise the glue tab for panel 46, but may be provided with a tab extension 66a, along its edge 70, defined from tab 66 by foldline 84, and panel 50, now designated $50^1$, may be relatively low and devoid of any article-retaining opening. Panel $50^1$ may be co-extensive in length with the end wall 16, and its side edges may be inwardly indented adjacent its outer edge to form ears 86, at its outer corners; the inner ear being partly cut out from tab 66, immediately adjacent glue tab extension 66a, whose outer side edge 88, may taper and whose inner side edge is defined by a cutline 90, which defines it from the outer edge of panel $50^1$.

In folding and gluing the embodiment of FIGS. 10 to 17, panels 46 and 48 are folded over on side walls 12 and 14, respectively; panel 52 is folded over on end wall 18; tab 66 is folded over on panel 46; and glue tab extension 66a is folded over on tab 66 on foldline 84. Glue is then applied to the exposed surfaces of tab 68, tab extension 66a, and the underside of glue tab 20. The blank is then folded over on foldline 26 to adhesively secure tab 68 to panel 52. End wall 16 is then folded over on foldline 22, so that it is adhesively secured to the glued surfaces of tab extension 66a and glue tab 20. Panel $50^1$ is not folded and remains projecting, as clearly seen in FIG. 12.

When the folded and glued blank is squared, tap extension 66a and tab 20 remain glued to end wall 16. Tab 66 assumes a diagonal position with its free end portion underlying the free tapered edge of panel 48 and its straight outer edge engaging against the side wall 14. Panel 48 and tab 68 assume the same position as in the first described embodiment. Panel $50^1$ is then folded down over the opening of the cradle and its ears 86 engaged in the openings 92, provided in the adjacent ends of panels 46 and 48, to thereby be held in folded position over the opening of the cradle with the ends of its ears braced against side walls 12 and 14.

While the last embodiment of the box of the invention has been illustrated and described as having the overhanging panel 50¹ at one end of the box, it will be readily apparent that a similar overhang may be formed at its other end by modifying panel 52 to be similar to panel 50¹ and providing tab 68 with a glue tab extension similar to 66a.

This completes the description of the several embodiments of the display box or carton of the present invention; the blanks from which they may be formed; and the manner in which they are folded and set up. It may here be stated that the particular structure and arrangement of the bottom-forming elements of the box may be varied in numerous additional ways to the ones illustrated and described. It will also be apparent that the angle of foldlines 62 and 64 may be varied to form deeper or shallower cradles, as may be desired, with the height of panels 48 and 46 and 52 being varied accordingly, to attain the preferred construction wherein their edges rest on the bottom wall of the box.

It may be further stated that the particular shape and form of the article-receiving openings in tabs 66 and 68, to individually support more than one article in the cradle.

It will be readily apparent that the box of the present invention provides an easily-formed and set up display container or package for one or more articles; that such box is, of itself, sturdy and firm and safely and securely supports the article or articles disposed therein against displacement and damage, to an extent where other types of packing may be eliminated for shipping purposes. It will also be apparent that the display box of the present invention does not require an undue amount of cardboard for its formation particularly in view of the advantages that it offers, and that it may be flat-folded and glued and set up on conventional apparatus, at standard speed, with little, if any, modification of such apparatus being required. It will be further apparent that the display box of the present invention, while it may be manually loaded with ease and rapidity, is also suitable for automatic, mechanical loading.

It will be likewise apparent that numerous variations and modifications may be made in the display boxes of the present invention, by anyone skilled in the art, in accordance with the principles of the invention hereinabove set forth, and without the exercise of any inventive ingenuity. We desire, therefore, to be protected for any and all such variations and modifications that may be made within the spirit of the invention and scope of the claims hereto appended.

What is claimed is:

1. An article-supporting display carton, of the character described, comprising an upright section forming pairs of opposed walls, pairs of opposed panels extending inwardly and downwardly from the upper edge of said upright section into said carton, each at an angle to one of said walls, one panel of each two adjacent of said inwardly-extending panels being integral with one of said walls and co-extensive at its base with the upper edge of said wall, said one panel having its side edge formed at an acute angle to said upper edge; another of the panels adjacent to said one panel integrally connected to said one panel along a side edge thereof, and means securing said adjacent panel to a wall adjacent said one wall.

2. The display carton of claim 1, wherein a selected one of an opposed pair of said panel extensions have means provided thereon for engaging the ends of an article.

3. The display carton of claim 1, wherein said adjacent panel has its free end substantially adjacent and parallel to the wall to the other side of said adjacent wall.

4. The carton of claim 1, wherein the means securing said adjacent panel to said adjacent wall comprises an inwardly-extending tab connected to said adjacent wall, said adjacent panel connected to said tab.

5. The carton of claim 4, wherein said article-engaging means comprises registering cutout portions in said adjacent panel and said tab.

6. The carton of claim 1, wherein the means securing said adjacent panel to said adjacent wall comprises a tab extending to said adjacent panel, said tab secured to said adjacent wall.

7. The carton of claim 6, wherein said adjacent wall is formed with a panel extension at its upper end, said panel extension inwardly folded over said carton and secured by its opposed side edges to the panel adjacent each of said side edges.

8. The carton of claim 1, wherein said inwardly-extending panels are of a height greater than said upright walls.

9. The carton of claim 1, including a bottom wall of at least one inwardly-folded panel connected to the bottom edge of said upright section and wherein at least two of said inwardly-folded panels are of a height greater than the height of said section, said two panels supported on said bottom wall.

10. The carton of claim 1, wherein said upright section is rectangular and provides pairs of opposed parallel walls.

11. The carton of claim 10, wherein said panel extension of each of said panels is formed with its side edge diagonally opposite to that of the other.

12. A blank for forming a display carton of the character described, comprising a strip of cardboard cut and scored to form an elongated section forming pairs of opposed walls and cradle-forming panels extending from one edge of said section, said panels including a panel connected to each of two alternate of said walls and foldable thereover, each said cradle panel co-extensive in length with said connected wall at their junction, each said cradle panel tapering inwardly and having a panel extension on one side edge thereof foldable thereover, said panel extension having parallel side edges, the angle of said side edges to said edge of said section being equal to the difference between 180° and the angle of the side edge of the panel to said connected edge of said section, and tab means on a selected one from said panel extension and the wall adjacent to said panel-connected wall for attaching said panel extension to said adjacent wall.

13. The cardboard blank of claim 12, wherein each of said panel extensions facing said adjacent wall is substantially co-extensive in length with said adjacent wall and the outer edge of said extension is at right angles to said side edges thereof.

14. The cardboard blank of claim 12, wherein said tab means is formed on said extension and is foldable thereover when said extension is folded over said connected wall.

15. The cardboard blank of claim 12, wherein said tab means is connected to said adjacent wall and is foldable inwardly thereover.

16. The cardboard blank of claim 12, wherein bottom-forming panels are connected to the other edge of said section.

17. The cardboard blank of claim 12, wherein cutout article-engaging portions are formed in the selected ones of the said pair of said opposed panels and the said pair of opposed panel extensions.

References Cited

UNITED STATES PATENTS

| | | | |
|---|---|---|---|
| 2,513,079 | 6/1950 | Buerger | 229—41 |
| 2,519,831 | 8/1950 | Frankenstein | 229—41 |
| 3,082,864 | 3/1963 | Silver | 229—14 |
| 3,093,290 | 6/1963 | Banks et al. | 206—45.14 |
| 3,270,867 | 9/1966 | Hennessey et al. | 206—45.14 |
| 3,302,778 | 2/1967 | McGorty et al. | 206—45.14 |
| 2,349,241 | 5/1944 | Arneson | 229—37 |

WILLIAM T. DIXSON, Jr., *Primary Examiner.*